L. BURN.
REVERSING AND VARIABLE SPEED GEAR.
APPLICATION FILED JUNE 8, 1915.

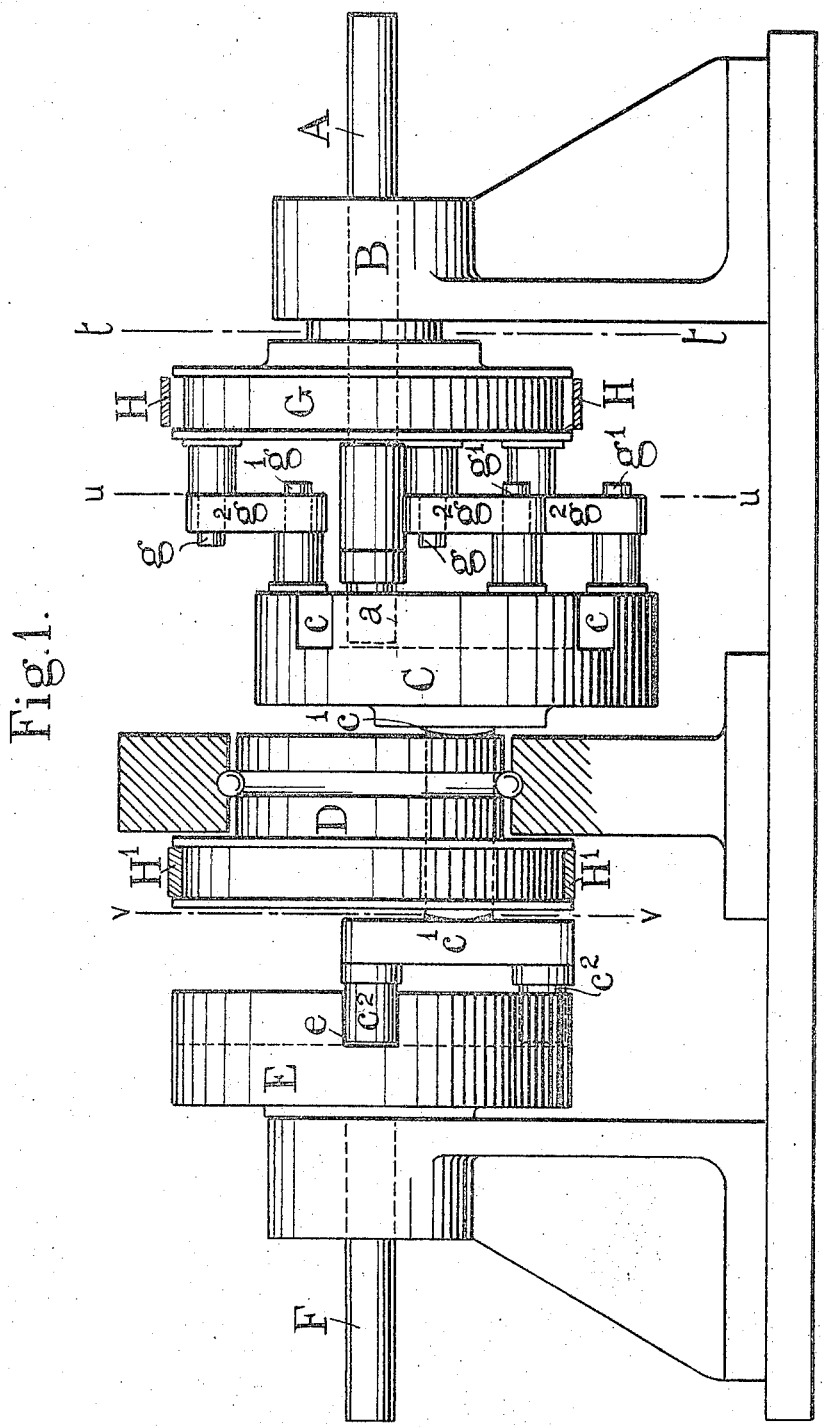

1,172,936.

Patented Feb. 22, 1916.
7 SHEETS—SHEET 2.

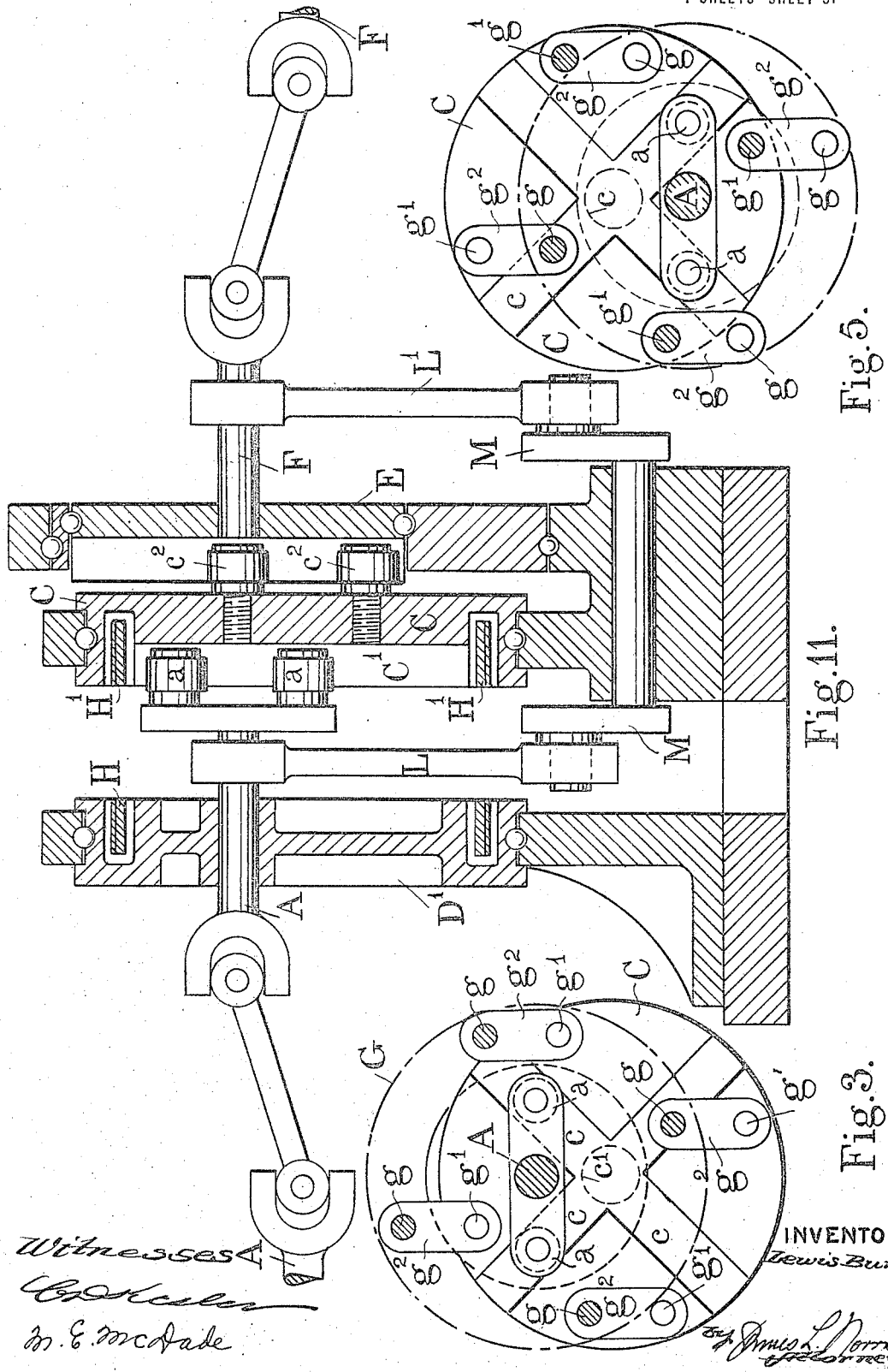

L. BURN.
REVERSING AND VARIABLE SPEED GEAR.
APPLICATION FILED JUNE 8, 1915.
1,172,936.
Patented Feb. 22, 1916.
7 SHEETS—SHEET 4.
Fig. 6.
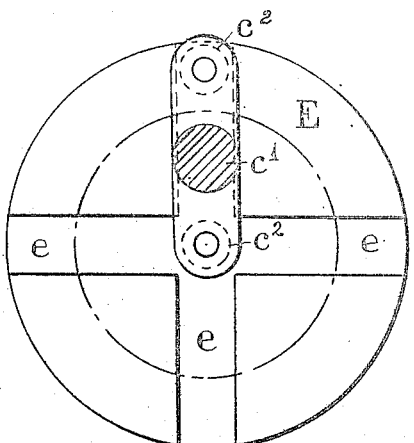
Fig. 8.
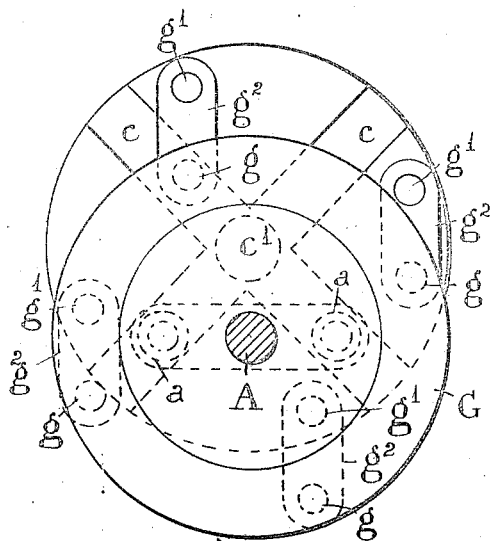
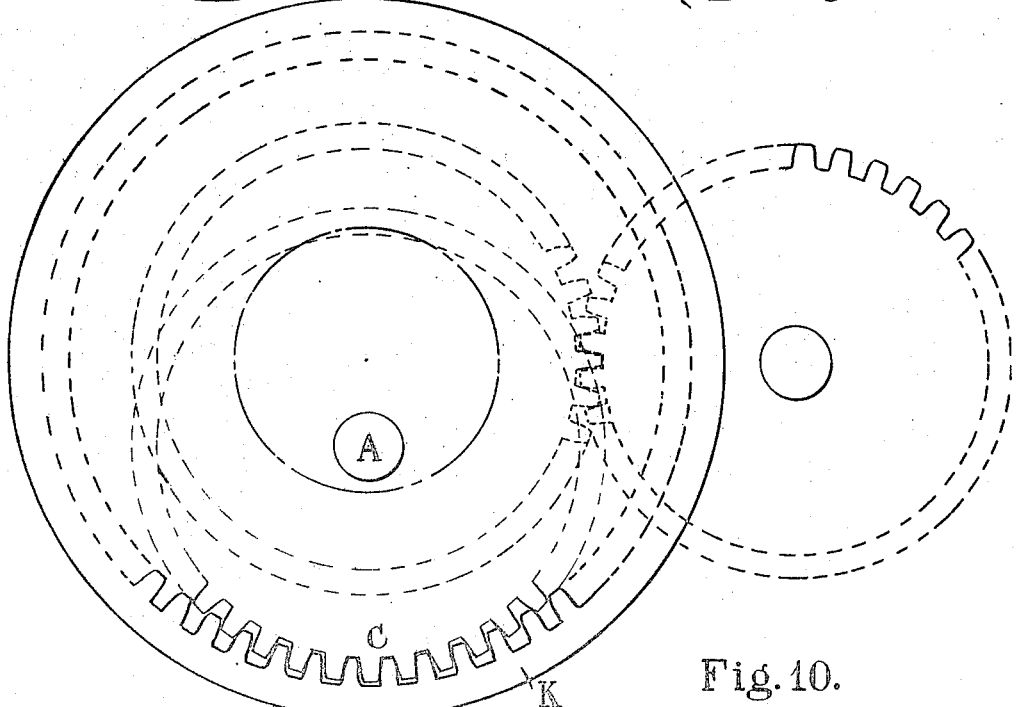
Fig. 10.
INVENTOR
Lewis Burn
By James L. Norris
Attorney

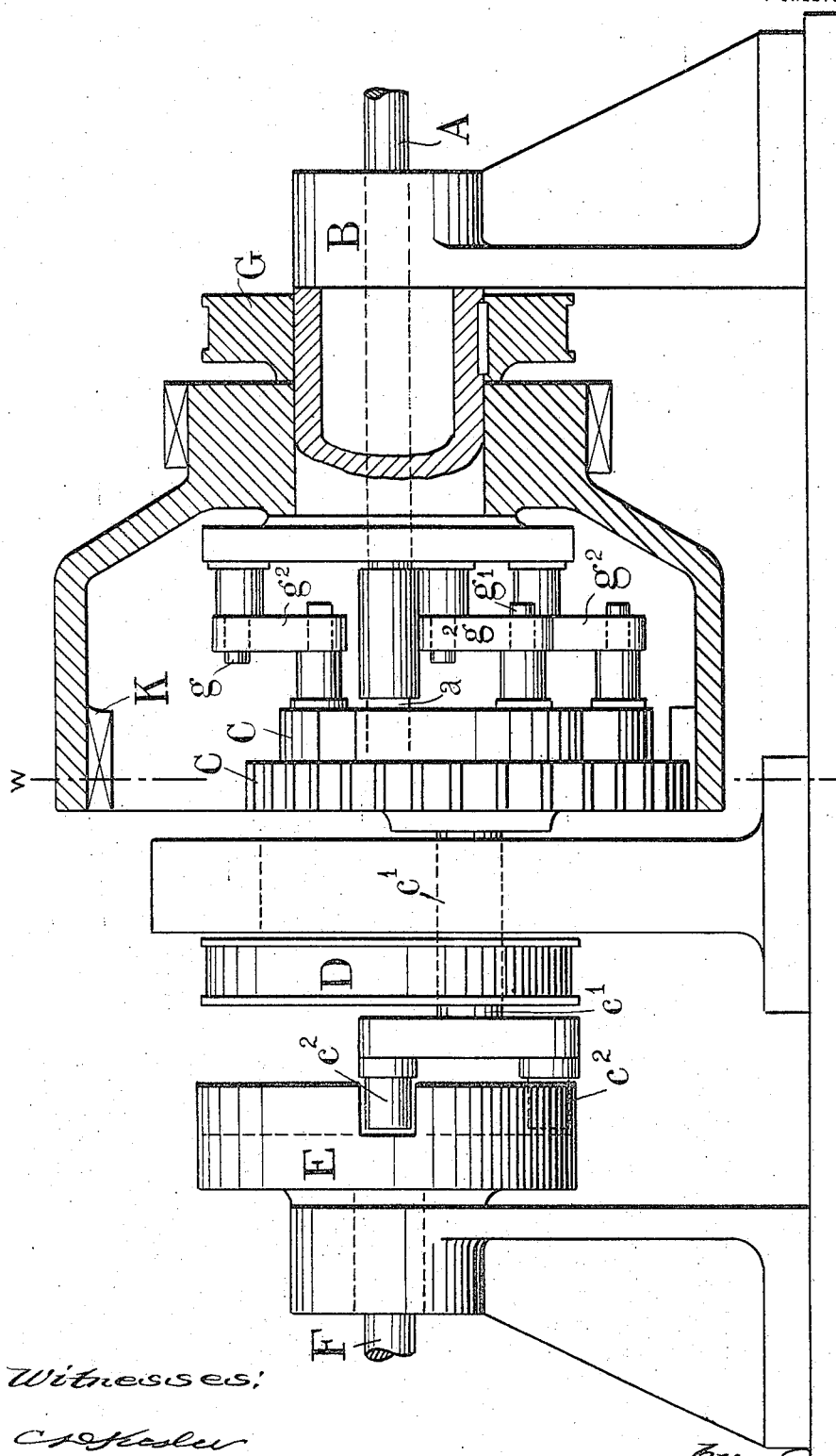

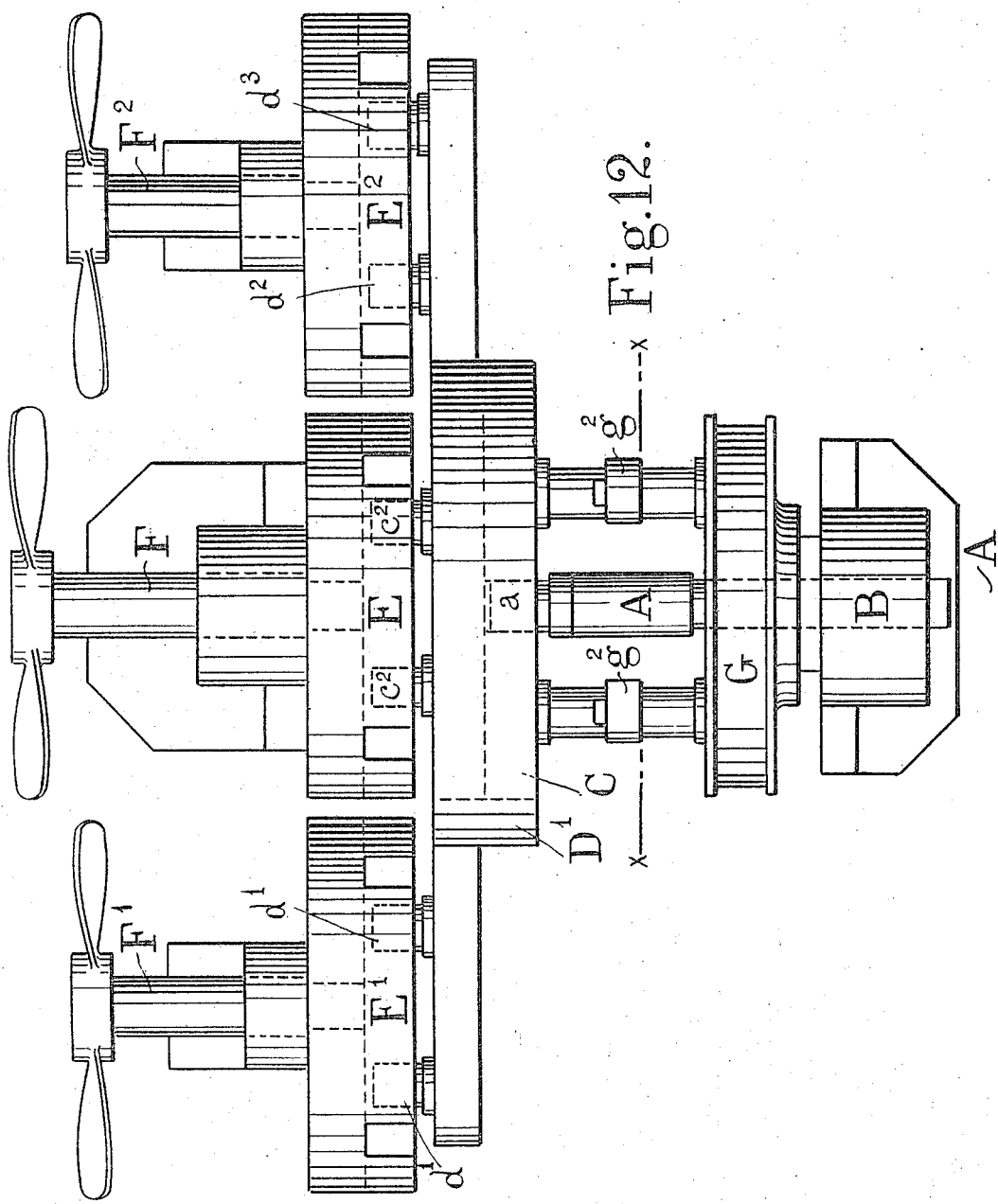

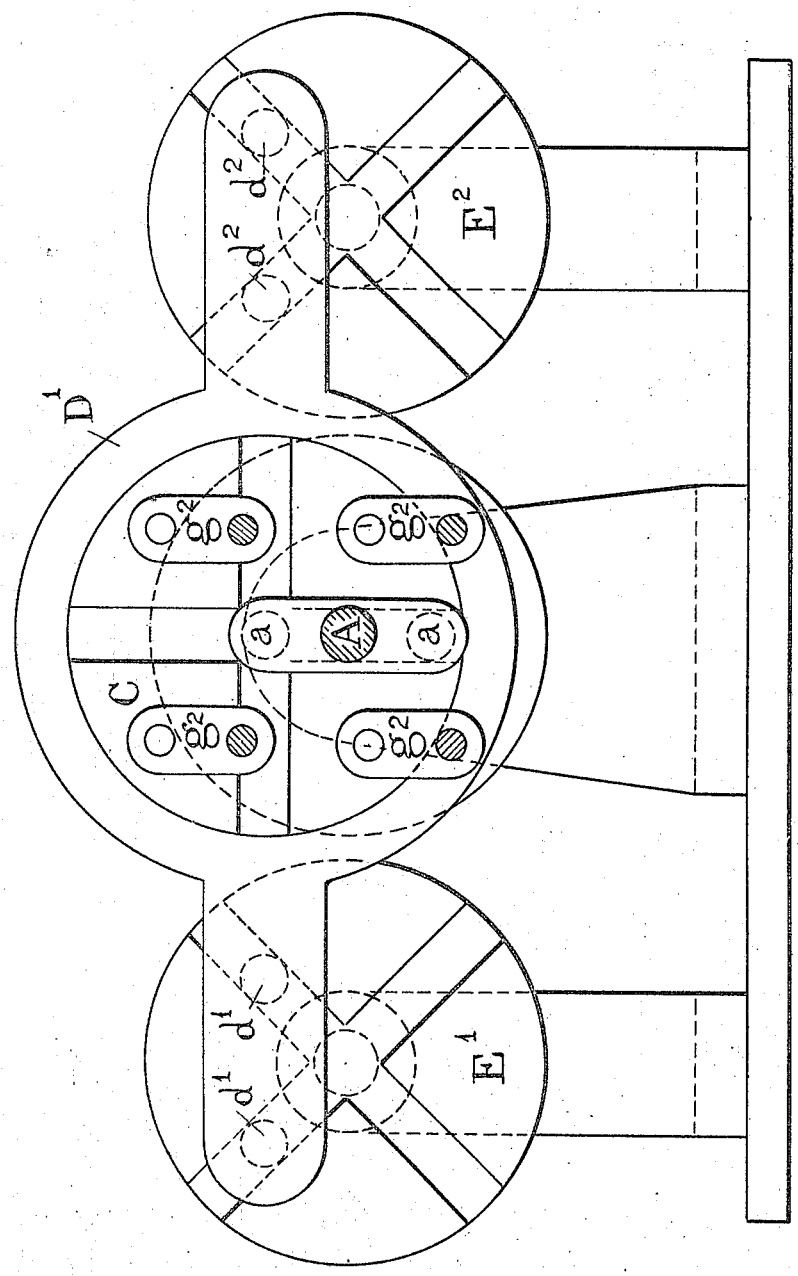

UNITED STATES PATENT OFFICE.

LEWIS BURN, OF MANCHESTER, ENGLAND.

REVERSING AND VARIABLE-SPEED GEAR.

1,172,936.     Specification of Letters Patent.     Patented Feb. 22, 1916.

Application filed June 8, 1915. Serial No. 32,964.

*To all whom it may concern:*

Be it known that I, LEWIS BURN, a British subject, residing at Old Trafford, Manchester, county of Lancaster, England, have invented certain new and useful Improvements in Reversing and Variable-Speed Gear, of which the following is a specification.

This invention relates to variable speed gear in which the driving is effected by means of double crank pins engaging diametric crossed slots in a driven disk and is designed to apply to such gear means whereby it can be reversed or rotated in the reverse direction in which case it will be applicable for planing and other machines and for marine and other motor driving where a reverse drive is desired.

It consists essentially in the construction and disposition of such gear comprising a rotary bearing in which the driven slotted disk is mounted eccentrically, a brake by which the rotation of the bearing can be retarded and arrested, and a brake disk loose on the driving shaft connected to the driven slotted disk by a series of cranks with a brake band by which the rotation of the brake disk can be retarded or arrested to vary the speed or reverse the direction of motion of the driven disk.

The invention will be fully described with reference to the accompanying drawings.

Figure 4:
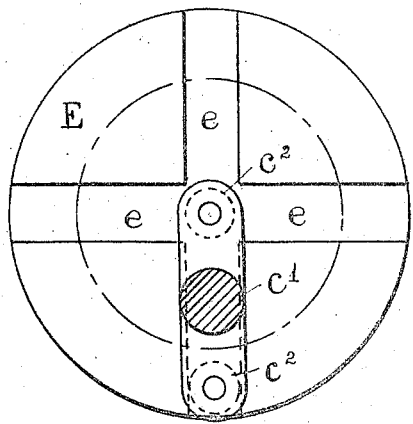
Figure 7:
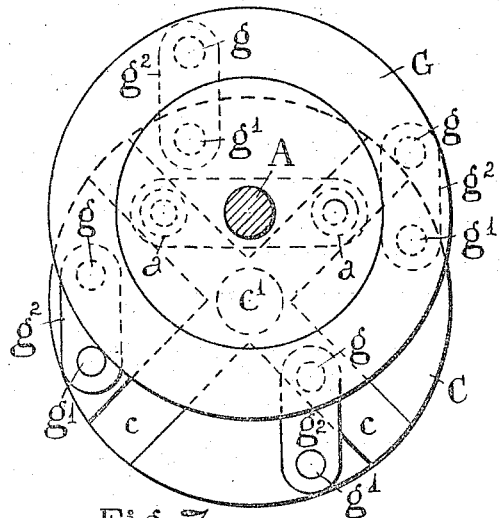
Figure 2:
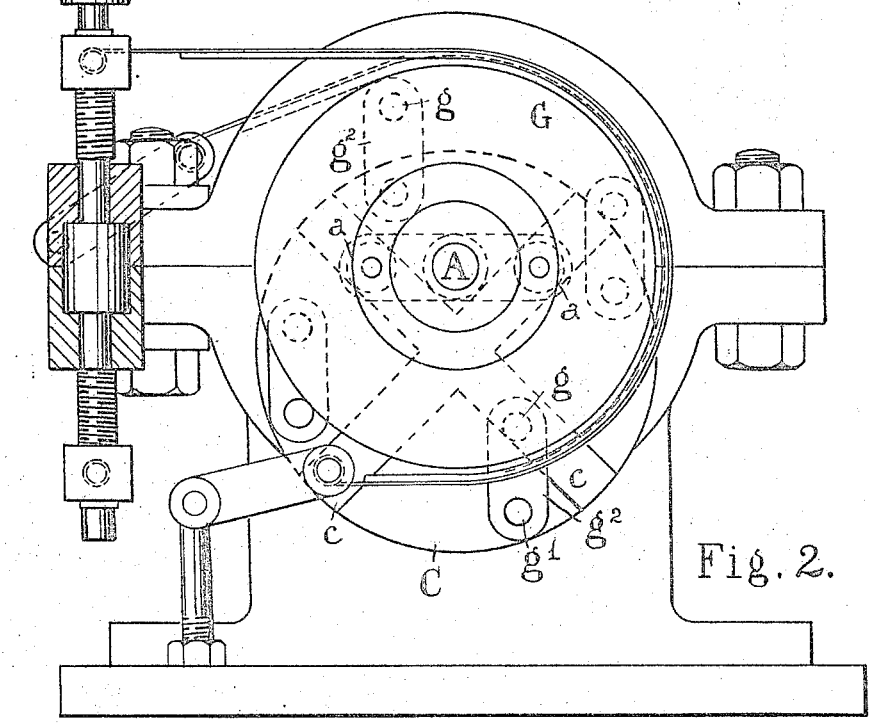

Figure 1 is a front elevation of the apparatus. Fig. 2 is a transverse section on line $t$—$t$, Fig. 1. Fig. 3 is a part section of the same on line $u$—$u$, Fig. 1. Fig. 4 is a part section of same on line $v$—$v$, Fig. 1. Fig. 5 is a part section similar to Fig. 3 parts in position for return or quick return stroke reducing in the ratio of 2 to 1 in the reverse direction. Fig. 6 is a part section similar to Fig. 4 parts in same position as in Fig. 5. Fig. 7 is a part section of same on line $t$—$t$ Fig. 1 parts in same position as Fig. 3. Fig. 8 is a part section of same on line $t$—$t$ Fig. 1 parts in same position as Fig. 5. Fig. 9 is a side elevation partly in section showing the invention as applied to a lathe. Fig. 10 is a section of same on line $w$—$w$ Fig. 9. Fig. 11 is a longitudinal section of a modification showing the shafts connected by universal joints. Fig. 12 is a plan of a further modification showing three shafts being driven from the driving shaft. Fig. 13 is a sectional elevation of same on line $x$—$x$ Fig. 12.

The driving shaft A mounted in suitable bearings B carries at its free end two pins $a$ placed at equal distances from the axis of the shaft and forming a double crank. In line with the driving shaft A but eccentric or not co-axial therewith is mounted a rotary disk C with two or more diametric slots $c$ cut in its face and intersecting at the center. The slots $c$ face the end of the driving shaft A and the driving or crank pins $a$ thereon engage the slots and as the driving shaft A rotates carries around the disk at a slower speed in the ratio of 1 to 2. The disk C is mounted in bearings eccentrically fitted in a rotary bearing disk D through which the shaft $c$ passes. The shaft $c'$ at its free end carries two crank driving pins $c^2$ similar to the crank driving pins $a$ on the driving shaft A and these engage a disk E with diametrically intersecting slots $e$ similar to the disk C. The disk E is affixed to the end of the driven shaft F the speed of which is further reduced in the ratio of 1 to 2. So constructed the apparatus will give a forward drive, the speed being reduced from the driving shaft A to the driven shaft F in the ratio of 1 to 4.

On the driving shaft A a disk G is loosely mounted to permit the shaft to rotate within it. The disk is fitted with a number of projecting pins $g$ and a number of similar pins $g'$ are fitted to project from the face of the slotted disk C and the two disks are connected by links $g^2$ loose on the pins $g$ $g'$. A brake H is applied to the disk G and a brake H' is also applied to the rotary bearing disk D the brakes being so arranged that one only can be applied at a time that is when one is applied the other is free and vice versa.

When driving in a forward direction the brake H' is applied to the rotary bearing disk D, the motion being arrested and the driven shaft rotates in the forward direction with a reduction of speed at a ratio of 1 to 4. For driving in the reverse direction the brake H is applied to the disk G which is prevented rotating and its projecting pins $g$ are brought to a standstill the brake H' being removed from the rotary bearing disk D to permit it to rotate. As the driving shaft continues to rotate the disk C is carried around in an eccentric path by the links $g^2$ around the pins $g$ at the same speed but in the reverse direction to the shaft A and with it the rotary bearing disk D and the second set of driving pins $c^2$. The disk E and the driven shaft F are thus driven in the reverse direction but the reduction of speed is only in the ratio of 1 to 2 thus in the reverse direction the speed will be twice as quick as in the forward direction. Therefore, it will be understood that when the brake H is applied, one rotation of the shaft A clock-wise causes one gyration of disk C counter-clock-wise, and this causes one-half a revolution of driven shaft F counter-clock-wise. Such a motion will be found very suitable for driving machine tools such as planing machines where a quick return motion is required.

A further variation in speed may be imparted by retarding or accelerating the speed of the driven disk C. This may be done by gearing as shown in Fig. 9. The parts A to H, are similar to those already described the disk C being provided with external teeth. An internal toothed wheel K is mounted loose on the shaft to gear with the teeth of the disk C, and this may be driven by gearing from cone pulleys or otherwise. It may be stopped or driven in either direction and at variable speeds thereby changing the speed of the driven shaft. To this may be applied a series of ordinary gear wheels to give any further desired variation. Or the speed of the driving shaft or motor may be varied and the speed of the eccentric kept constant.

In the form shown in Fig. 11 the driving shaft A and driven shaft F are mounted in bearings carried on rods L L' mounted on cranks or crank pins M to permit of the bearings rising and falling with the movements of the eccentrics C' and D'. The shafts are connected by knuckle or universal joints or a length of flexible shafting with the main driving and driven shafts. The disks or eccentrics are mounted in suitable bearings and provided with brakes to control their movement, the brakes or brake straps being connected or so mounted that as one is applied the other is released and vice versa so that both brakes cannot be applied at the same time.

In Figs. 12 and 13 a form of the apparatus is shown applicable for driving screw propellers. The parts A to H are similar to those already described. To drive three propellers simultaneously at the same speed the forward motion of the propellers is taken from the driven disk C when rotating in the reverse direction to the shaft A. The driven disk C is mounted in a strap D' additional pins $d'$, $d^2$ engaging two laterally disposed slotted disks E' E² carrying driven or propeller shafts F' F². For reversing the propellers the brake is released from the disk C and the propeller or shaft F rotates in the opposite direction the propellers on shafts F' F² ceasing to rotate. It is to be understood that the change gear may be applied with such variations as may be required to any other machine.

What I claim as my invention and desire to protect by Letters Patent is:—

1. A reversing and variable speed gear comprising in its construction a driving shaft carrying driving crank pins at its free end, a rotary driven disk with a plurality of diametric slots cut in its face with which the said crank pins of the driving shaft engage, said driven disk having crank pins, a rotary disk mounted eccentrically relatively to the slotted driven disk and forming a bearing or carrier therefor, a brake disk loose on the driving shaft and operatively connected to the driven disk, brakes to stop the rotation of either one of the disks, and a second slotted driven disk engaged and actuated by the crank pins on the first named driven disk.

2. Apparatus for reversing the direction of motion of gearing, comprising a driving shaft carrying driving crank pins, a driven disk having diametric slots engaged by said crank pins, and a brake disk loosely mounted on the driving shaft and connected to said slotted disk, the brake disk being operable to have its forward movement retarded and arrested to cause the slotted disk to move in an eccentric path and in a reverse direction.

3. In an apparatus of the class specified, a driving shaft having terminal driving means, a rotary disk provided with diametric slots engaged by said means, a driven shaft also having a diametrically slotted disk thereon, the said disk of the driven shaft being operated by the first named disk, brake means coöperating with one of said disks, a rotary disk mounted to operate eccentrically relatively to the first named slotted disk, and means connected to the first named slotted disk and engaging the slotted disk on the driven shaft to actuate the latter.

4. In an apparatus of the class specified, a driving shaft carrying driving crank pins at its free end, a rotary driven disk with a plurality of diametric slots formed therein and engaged by the crank pins of the said driving shaft, a rotary disk mounted eccentrically relatively to the slotted disk and forming a bearing or carrier therefor, the said slotted disk also having crank pins connected thereto, a brake disk loosely mounted on the driving shaft and having links connected to the first named driven disk, and a driven shaft having a slotted disk thereon engaged by the crank pins of the first named driven disk.

In testimony whereof I have hereunto set my hand in presence of two subscribing witnesses.

LEWIS BURN.

Witnesses:
　Geo. H. O'Brien,
　William A. Gall.